United States Patent [19]

Beiter et al.

[11] Patent Number: 4,751,551
[45] Date of Patent: Jun. 14, 1988

[54] COOLING MECHANISM FOR SCANNING LAMP ASSEMBLY

[75] Inventors: Robert K. Beiter, Ontario; Stephen C. Corona, Rochester, both of N.Y.

[73] Assignee: Xerox Corporation, Stamford, Conn.

[21] Appl. No.: 81,077

[22] Filed: Aug. 3, 1987

[51] Int. Cl.⁴ ............................................. G03B 27/52
[52] U.S. Cl. .................................................... 355/30
[58] Field of Search ...................... 355/8, 11, 30, 51, 1

[56] References Cited

U.S. PATENT DOCUMENTS

| | | | |
|---|---|---|---|
| 3,330,180 | 7/1967 | Ferguson et al. | 335/30 |
| 3,762,814 | 10/1973 | Kitch | 355/30 |
| 3,936,672 | 2/1976 | Tanaka | 355/1 |
| 4,411,516 | 10/1983 | Adaci et al. | 355/30 |
| 4,632,539 | 12/1986 | Temple | 355/30 |

*Primary Examiner*—Richard A. Wintercorn

[57] ABSTRACT

This invention relates to apparatus for selectively cooling an elongated lamp in a document scanning mode. A flow of cooling air is created which passes along a conduit extending along the length of the lamp to provide selective cooling draughts along various portions of the lamp envelope. The source of the cooling air is a blower directing air along the interior of a guide rail extending in parallel with the direction of movement of the lamp. One end of the conduit is thermaqlly coupled to the interior of the guide rail so as to connect a flow of cooling air passing through the guide rail interior into the interior of the conduit at all relative positions of the scanning lamp. A recoiling tape is connected between the lamp and the cooling air source, the tape being withdrawn during a scan operation to effectively seal the guide rail interior, confining the moving air in a more efficient fashion. The cooling air passing through the conduit is used to either directly cool discrete portions of the lamp or to cool heast exchangers which are in contact with the lamp.

5 Claims, 3 Drawing Sheets

COOLING MECHANISM FOR SCANNING LAMP ASSEMBLY

This invention relates to air-cooled apparatus, particularly of the type in which a longitudinal heat-emitting body is translated or reciprocated along a fixed path transverse to the axis of the body.

One such heat-emitting body for which the present invention is particularly suitable is the low-pressure, mercury vapor, fluorescent discharge lamp as used in some xerographic copiers. Such a lamp for its operation requires that its body be heated to a temperature at which the mercury in the lamp is partially vaporized to facilitate the light-emitting electrical discharge. To facilitate its operation, the lamp body needs to have one or more "cold spots" in order to induce condensation of the mercury vapor at selected locations. Such cold spots may be brought about, for example, by positioning at least one heat exchanger in thermal contact with the lamp body, the heat exchanger being cooled by a forced draft.

There are various devices known in the prior art for cooling lamp assemblies used to provide document illumination at an object plane. U.S. Pat. No. 3,936,672 discloses a system for cooling a halogen lamp enclosed in a casing by means of a pair of cooling fans mounted at the ends of the lamp. U.S. Pat. No. 4,411,516 discloses a system for cooling an area surrounding a halogen lamp by forming a heat pipe integral with the reflectors surrounding the lamp. The heat pipe serves to draw heated air out of the area beneath the lamp and surrounding the platen. In U.S. Pat. No. 3,330,120 an illumination arrangement is shown wherein banks of lamps are contained within a light housing. A first blower is connected by duct work into the housing interior to provide a general cooling effect. A second blower is connected by tubing to provide a preferential air flow to specific areas of the lamps. U.S. Pat. No. 4,632,539, assigned to the same assignee as the present invention, discloses a system in which a document is scan/illuminated by a lamp assembly which is moved along a guide rail positioned in a plane parallel to a document platen. Heat exchangers are in thermal contact with portions of the lamp envelope and are located in a conduit adjacent to and parallel with, the lamp. A cooling flow of air is directed along a recess formed in one of the guide rails. The air travels along the recess and is diverted into the conduit to provide a cooling effect on the heat exchangers. One limitation of this air cooling mechanism is that there is some escape of air from the guide rail recess into the housing interior. For some illumination systems, the remaining air reaching the heat exchanger may be insufficient to provide the required cooling level. An improved apparatus of the type described in U.S. Pat. No. 4,632,539 is provided in accordance with one aspect of the present invention wherein means are provided to better confine the cooling air to the guide rail interior thereby increasing the air flow reaching the heat exchanger. The invention is also applicable to a scan illumination system which does not utilize heat exchangers but rather depends upon discrete air draughts applied across areas of the lamp envelope to produce the required "cold spots". More specifically, the present invention is directed towards an apparatus for scan/illuminating a document lying in an object plane comprising:

an illumination lamp assembly including an elongated illumination lamp, and an air passage conduit adjacent to, and extending the length of the lamp, said lamp assembly adapted to move along at least one guide means located in a plane beneath and parallel to said object plane, said guide means having a longitudinally extending recess formed along at least a part of its length, means for introducing cool air into said guide means recess, means connected between said cool air introduction means and said lamp assembly for progressively enclosing said recess during a scan operation, and means for diverting air flow from said recess into said conduit interior during a scan operation, whereby cool air travels along said confined recess and is diverted by said diverting member into said conduit.

Figure 1:
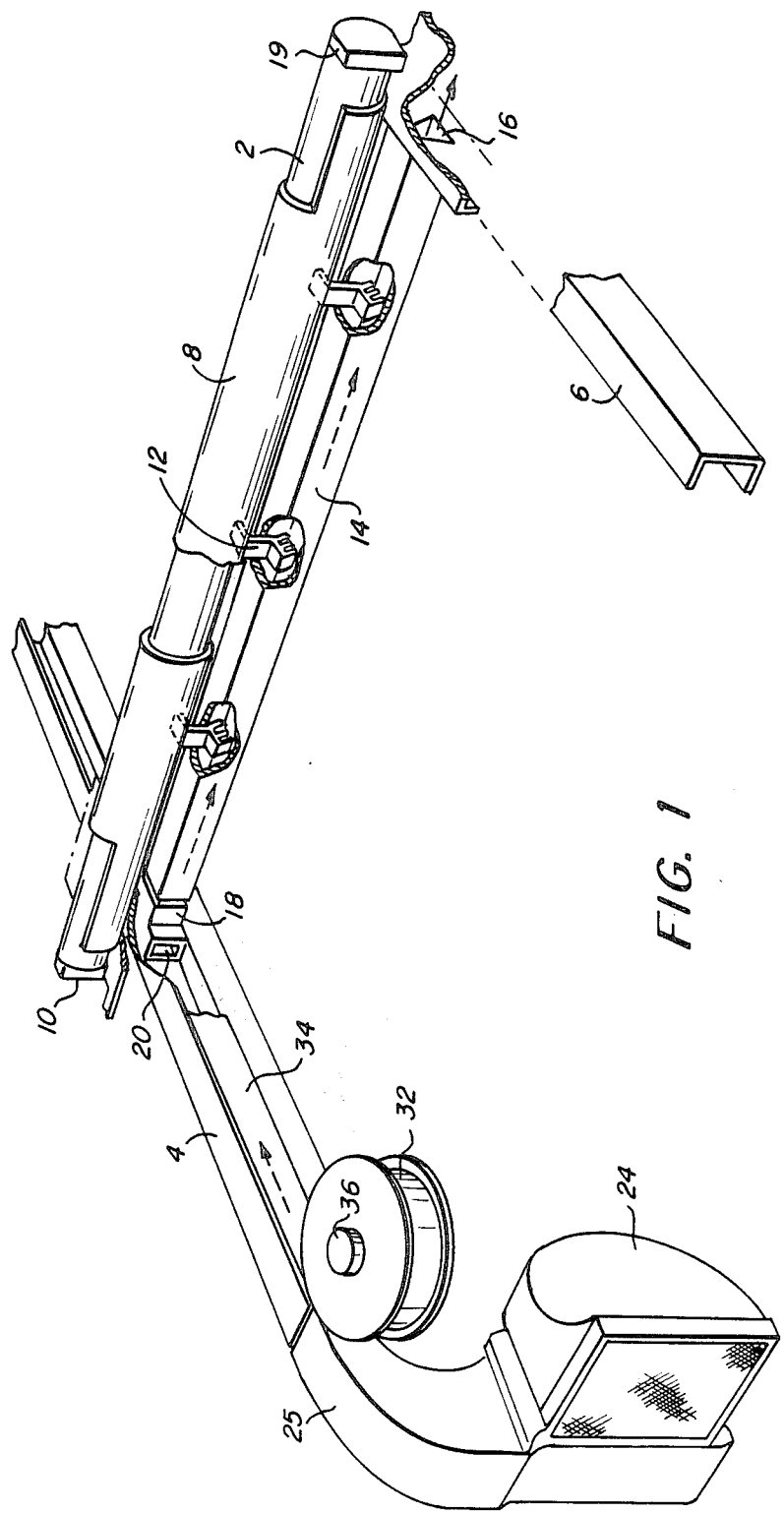
FIG. 1 is a perspective diagram of a first embodiment of a scanning lamp assembly incorporating the improved cooling mechanism of the present invention.

As shown in FIG. 1, a low-pressure, mercury vapor, fluorescent discharge lamp 2 is reciprocated (by means not shown) along the length of a pair of guide rails 4 and 6 extending in parallel with each other and perpendicularly to the axis of the lamp 2.

Closely encircling the external surface of the lamp body is an electrically-energized heater jacket 8 positioned so as not to block the path of light between the lamp 2 and an associated platen (not shown) on which is positioned a document to be copied. The lamp 2 extends across the guide rails 4 and 6 and is supported by them for reciprocal movement over the area between them under the influence of an intermittently-operated drive motor (not shown). The electrical connections to the end terminals 10 on the lamp 2 are such as to permit the lamp to be energized as it traverses below the platen in at least one direction, in order to illuminate a document supported by the platen so that light reflected from the document selectively discharges an associated photoreceptor (not shown) forming a latent image of the document thereon.

For effective operation of the lamp 2, it is desirable or necessary to have cold spots provided at at least one location of the lamp envelope, so as to enhance the condensation of mercury vapor at that point. A supply of free liquid mercury is necessary to facilitate the gaseous discharge process taking place in the lamp. As shown in the FIG. 1, three cold spots are provided, each being brought about by contacting the surface of the lamp 2 with one limb of a metal heat exchanger 12. The limb is in good thermal contact (by virtue of its integral construction) with three fins designed to present a large surface area to a flow of cooling air, so as to enhance the loss of heat from the lamp body to the air. This loss is encouraged by arranging for each heat exchanger 12 to project into the interior of a conduit 14 of rectangular cross-section which is secured to the lamp assembly so as to extend between the guide rails 4 and 6.

At the right-hand end of conduit 14 as viewed, the stream of cooling air is exhausted into the interior of the copier through an outlet 16. At its other end the conduit is provided with a scoop 18 presenting a rectangular inlet 20 at right-angles to the axis of the lamp and covering a significant part of the cross-sectional area of the interior of guide rail 4. As can be seen from the drawing, guide rail 4 is of substantially rectangular cross-section, with one wall missing in order to leave a longitudinally-extending opening 22 through which the scoop 18 projects into the interior of the guide rail.

At one end, this interior space of guide rail 4 is connected to one outlet 23 of a blower 24.

Figure 2:
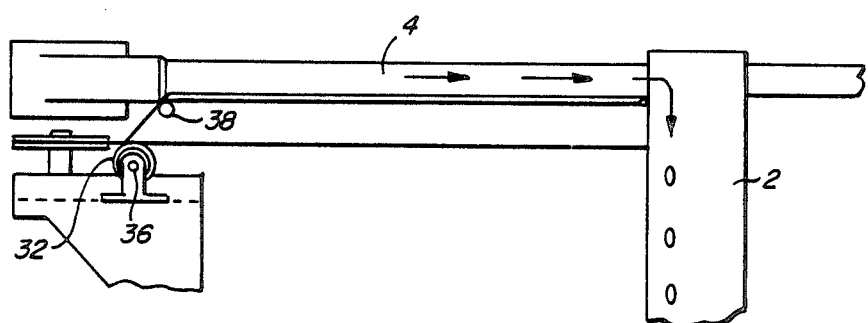
FIG. 2 is a top view of the guide rail shown in FIG. 1, having the interior recess enclosed by the recoiling tape member of the present invention.
Figure 3:
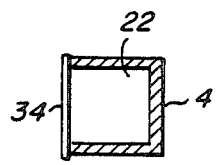
FIG. 3 is a cross-sectional end view of the guide rail enclosed by the recoiling tape member.

Closely positioned to blower 24 is top supply spool 32. One end of tape member 34 is attached to a recoil spring 36 which, in turn, is attached to the spool. Tape 34 has a width equal to that of opening 22 and a length sufficient to extend from the start-of-scan to the end-of-scan position. The tape is tensioned by fixed roller 38 (FIG. 2) so as to lie flat against the sides of opening 22 effectively providing a seal for the interior of guide rail 4. The other end of tape 34 is connected to a fixed point in lamp assembly 2. During a scan operation with blower 24 energized, lamp 2 moves in a scanning operation from left to right. The tape unwinds covering opening 22 and confining the air flow to opening 22, having the effect of maximizing the air flow into conduit 14 and then enhancing the cooling effect on the heat exchanger.

It will be appreciated that as the lamp moves towards the blower, the increased relative speed of the lamp and blower causes a greater quantity of air to flow along the conduit, so as to increase the cooling effect, but the resultant transient increase of cooling has a negligible effect on the light output of the lamp, because of the time delays inherent in the length of the various heat flow paths.

From the above, it will be clear that the heater 8 loses heat to the lamp body 2, which in turn, loses heat to the heat exchangers.

One of the heat exchangers is provided with a thermistor (not shown) for monitoring the temperature of the space below the platen. The thermistor is in the energization circuit to blower 24, so that the blower is switched on whenever the cavity temperature exceeds 40° C. It is also responsive to the temperature of the heat exchanger itself, so that the blower is also switched on when the temperature of the heat exchanger approaches too closely the temperature of the lamp. When the temperature of the heat exchanger is below 30° C., and the copier is in its "copy" mode, the blower will remain or become switched off.

Figure 4:
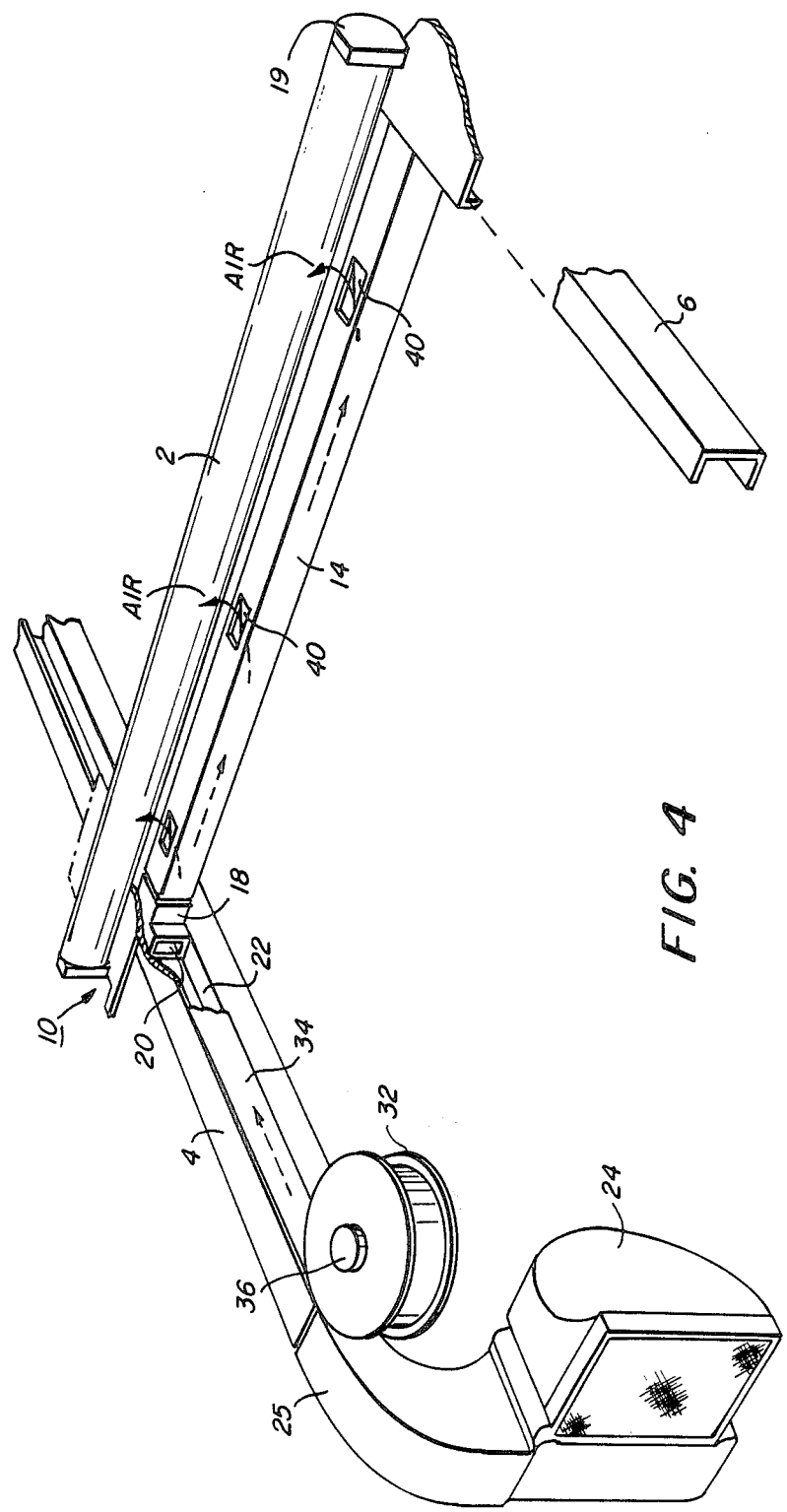
FIG. 4 is a perspective disagram of a second embodiment of a scan lamp assembly incorporating the cooling mechanism of the present invention.

Turning now to FIG. 4, there is shown a second embodiment of the scanning lamp mechanism wherein the heat exchangers have been removed and the conduit 14 has been modified to create an upward diversion of air adjacent the lamp envelope as the air circulates along the conduit interior. Rectangular tabs 40 are formed on the top surface of the conduit by cutting along three sides. The tab is then bent downward so as to extend into the interior of the conduit. Each tab 40 then acts as a deflector to divert a part of the passing air upward against a portion of the lamp envelope (the lamp is shown in this view with the central portion cut away to enable a more accurate description of the tabs). By adjusting the size, angle and total number of tabs, any number of cold spots can be created on the lamp envelrope. This manner of creating cold spots using only air draughts is enabled by the improved efficiency of the air flow made possible by recoiling tape member 34.

While the invention has been described with reference to the structure disclosed, it is not confined to the details set forth, but is intended to cover such modifications or changes as may come within the scope of the following claims:

What is claimed is:

1. An apparatus for scan/illuminating a document lying in an object plane comprising:
    an illumination lamp assembly including an elongated illumination lamp and an air passage conduit adjacent to, and extending the length of the lamp,
    said lamp assembly adapted to move along at least one guide means located in a plane beneath and parallel to said object plane, said guide means having a longitudinally extending recess formed along at least a part of its length,
    means for introducing cool air into said guide means recess,
    means connected between said cool air introduction means and said lamp assembly for progressively enclosing said recess during a scan operation, and
    means for diverting air flow from said recess into said conduit interior during a scan operation,
    whereby cool air travels along said confined recess and is diverted by said diverting member into said conduit.

2. The apparatus of claim 1 further including at least one heat exchanger having one end in thermal contact with the lamp and the other end extending into said conduit.

3. The apparatus of claim 1 wherein said means for progressively enclosing said recess includes a tape member connected between said lamp assembly and a fixed point adjacent the start of scan position, said tape member adapted to be withdrawn from a supply spool during a scan operation so as to progressively enclose said recess.

4. The apparatus of claim 1 wherein said supply spool incorporates a recoil spring which causes said tape member to be wound back onto the spool during the return motion of the lamp assembly.

5. The apparatus of claim 1 wherein said conduit has a plurality of tab members projecting into said conduit interior, said tab members adapted to divert a portion of the air flow upward against a portion of the lamp envelope.

* * * * *